(12) United States Patent
Johansson et al.

(10) Patent No.: US 9,399,568 B2
(45) Date of Patent: Jul. 26, 2016

(54) ARRANGEMENT FOR DISPENSING AN ADDITIVE INTO A LIQUID STREAM

(75) Inventors: Daniel L. Johansson, Enebyberg (SE); Pedro Roel, Sollentuna (SE)

(73) Assignee: AKTIEBOLAGET ELECTROLUX, Stockholm (SE)

( * ) Notice: Subject to any disclaimer, the term of this patent is extended or adjusted under 35 U.S.C. 154(b) by 25 days.

(21) Appl. No.: 13/816,090

(22) PCT Filed: Jul. 28, 2011

(86) PCT No.: PCT/EP2011/063004
§ 371 (c)(1),
(2), (4) Date: May 28, 2013

(87) PCT Pub. No.: WO2012/019922
PCT Pub. Date: Feb. 16, 2012

(65) Prior Publication Data
US 2013/0240565 A1     Sep. 19, 2013

Related U.S. Application Data

(60) Provisional application No. 61/373,036, filed on Aug. 12, 2010.

(51) Int. Cl.
*B67D 7/74*        (2010.01)
*B67D 1/00*        (2006.01)
*A47J 31/40*       (2006.01)

(52) U.S. Cl.
CPC ............. *B67D 1/0079* (2013.01); *A47J 31/402* (2013.01); *A47J 31/407* (2013.01)

(58) Field of Classification Search
CPC ............................ B67D 1/0079; A47J 31/402
USPC ................................. 222/129.3, 129.4, 145.5
See application file for complete search history.

(56) References Cited

U.S. PATENT DOCUMENTS

| | | | |
|---|---|---|---|
| 2,979,231 A | | 4/1961 | Witherspoon |
| 3,165,299 A | * | 1/1965 | Balamuth ............. B01F 11/025 222/129.1 |
| 4,624,395 A | | 11/1986 | Baron et al. |
| 4,656,933 A | * | 4/1987 | Aschberger et al. ......... 99/323.1 |
| 4,729,495 A | * | 3/1988 | Aschberger ............. G05D 9/12 222/129.4 |
| 5,413,742 A | * | 5/1995 | Gatter ................ B01F 3/04787 222/146.6 |
| 5,730,324 A | * | 3/1998 | Shannon et al. ................ 222/61 |
| 7,578,419 B2 | * | 8/2009 | Greenwald et al. ........... 222/333 |
| 2004/0026451 A1 | * | 2/2004 | Jones ........................ 222/129.1 |
| 2008/0173705 A1 | | 7/2008 | Girard et al. |

OTHER PUBLICATIONS

International Search Report for PCT/EP2011/063004, dated Sep. 1, 2011, 2 pages.

* cited by examiner

*Primary Examiner* — Daniel R Shearer
(74) *Attorney, Agent, or Firm* — Pearne & Gordon LLP

(57) ABSTRACT

An arrangement for dispensing an additive into a liquid stream is provided. The arrangement includes a conduit for guiding a liquid stream and a dosing device. An opening is provided through a wall of the conduit. The dosing device is arranged at the opening of the conduit for dispensing an additive into the stream through the opening. The dosing device extends above the conduit. The conduit and the dosing device are arranged such that a vertical distance is defined between the dosing device and the liquid stream to prevent direct contact between them when in use. A refrigerator door that includes the arrangement and a method of dispensing an additive into a liquid stream are also provided.

20 Claims, 4 Drawing Sheets

ARRANGEMENT FOR DISPENSING AN ADDITIVE INTO A LIQUID STREAM

FIELD OF THE INVENTION

The present invention relates to an arrangement and a method for dispensing an additive into a liquid stream.

BACKGROUND

One major application of refrigerators is the refrigeration of liquids for drinking, such as water and soft drinks, carbonated or non-carbonated. In order to somewhat satisfy this consumer demand, some modern refrigerators comprise integrated dispensers for filtrated cold water and/or ice cubes, whereby the consumer no longer needs to actively put bottles of decanters of water in the fridge. However, many other drinking liquids still needs to be bought in a store, brought home and placed in a fridge, taking up lots of space in said fridge.

US 2006/0021919 discloses a cartridge for selectively dispensing an additive to water that includes a housing, a bladder disposed within the housing, and a pump connected to the housing and in fluid communication with the bladder. The bladder is configured to contain a consumable additive such as a flavour, for water. The pump is operable to selectively dispense an amount of the additive into water. The cartridge may be connected to a water filtration system such that the cartridge may dispense the additive into filtered water. However, such a cartridge is too bulky to be integrated in household appliances, and is high maintenance which makes it unsuitable as a consumer product.

WO 2009/058839 discloses dispensers for dispensing liquid from a concentrate/extract cartridge. The dispensers each include an actuating coil into which a dispensing tube is inserted. The concentrate/extract cartridge allows for dispensing a liquid in an accurate and repeatable manner. The cartridge includes an electromagnetically actuated piston connected to a valve. The piston includes an exterior ring supported by a hollow interior web that is configured to permit a flow of fluid into the dispensing tube when the valve body is in contact with the valve seat. A membrane is located below the web and is in sealing o contact with the internal ring when the piston is activated. A controller is connected to the coil for controlling the actuation of the piston/valve assembly for dispensing the fluid in the cartridge. However, there is no guidance on how to integrate such dispensers into household appliances such as white goods with low maintenance.

SUMMARY OF THE INVENTION

It is an objective of the present invention to overcome at least some of the shortcomings of the prior art.

According to an aspect of the present invention, there is provided an arrangement for dispensing an additive into a liquid stream, the arrangement comprising: a conduit for guiding a liquid stream, wherein an opening is provided through a wall of the conduit; and a dosing device arranged at the opening of the conduit wall and extending above the conduit, and arranged for dispensing an additive into the stream through the opening; wherein the conduit and dosing device are arranged such that a vertical distance is defined between the dosing device and the liquid stream to prevent direct contact there between when in use.

By configuring the arrangement such that direct contact between the dosing device and the liquid is prevented when the arrangement is used, the risk of contamination of the dosing device as well as other elements, such as any mounting for the dosing device etc, by the liquid may be reduced, reducing the need for cleaning and maintenance of the arrangement. The arrangement is thus made consumer friendly in that respect. Also, by configuring the arrangement such that direct contact between the dosing device and the liquid is prevented exchanging the dosing device is made more easy since it does not need to agitate the liquid stream, why it may not be needed to stop the flow of the liquid stream before removing and replacing the dosing device.

Arranging the dosing device above the conduit and such that the dosing device can dispense the additive into the stream through an opening, or hole, in the conduit wall while there is still no contact between the dosing device and the liquid implies that the liquid does not rise through the opening, at least not high enough to make contact with the dosing device.

According to another aspect of the present invention, there is provided a fridge door comprising the arrangement of the aspect of the invention discussed above.

According to another aspect of the present invention, there is provided a method of dispensing an additive into a liquid stream, the method comprising: guiding a liquid stream through a conduit, the conduit having an opening provided through a wall of the conduit; dispensing an additive into the liquid stream through the opening by means of a dosing device arranged at the opening of the conduit wall and extending above the conduit; wherein the conduit and dosing device are arranged such that a vertical distance is defined between the dosing devise and the liquid stream whereby there is no direct contact there between.

The discussion above relating to the arrangement is also in applicable parts relevant to the inventive method, why reference is made to that discussion.

BRIEF DESCRIPTION OF THE DRAWINGS

Specific embodiments of the present invention will below be discussed in more detail by way of non-limiting examples and with reference to the appended drawings in which.

DETAILED DESCRIPTION OF SPECIFIC EMBODIMENTS

Figure 1:
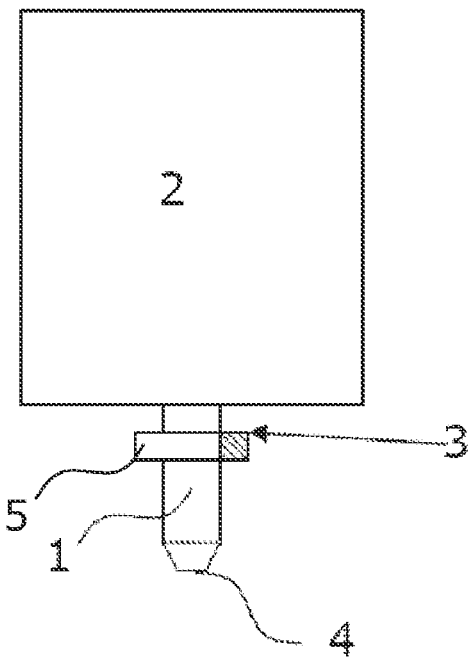
FIG. 1 is a schematic front view of a dosing device and additive container according to a specific embodiment of the present invention.

The liquid stream may typically be water, such as tap water, carbonated or non-carbonated, guided to the arrangement by an extension of the conduit or by another conduit. The flow rate may typically be in the range of 0.5 to 3 L/min, such as 1-2 L/min e.g. about 1.5 L/min.

The additive may e.g. be a flavouring, a beverage concentrate, vitamins, minerals, medicines, nutritional additives etc. or a combination thereof. The additive may be in the form of a powder or a liquid, preferably a liquid.

The dosing device may be any dosing device suitable for dispensing an additive through an opening or hole in the conduit. Since the dosing device may be contaminated by the additive, it may be convenient with a disposable dosing device, such that a new dosing device may be used e.g. when an additive is exchanged for another or when an old empty additive container is exchanged with a new container.

The conduit may typically be a rigid or flexible pipe or tube. The conduit is provided with an opening, i.e. a hole in its wall. The opening is conveniently positioned at the top of the conduit, above the liquid stream, such that liquid may not pour out of the conduit by act of gravity. However, the liquid stream, such as tap water, is typically pressurised whereby there is a risk of the liquid rising up through the opening even against gravity, contaminating its surroundings such as the dosing device, outside of the conduit etc. In order to prevent this, the arrangement needs to be specifically designed.

The arrangement may be configured for a pressure in the opening of the conduit wall which is atmospheric or less. This allows for a simpler design with lower maintenance since there does not have to an air or water tight seal between the conduit and the dosing device. Instead, the conduit may be open to the ambient atmosphere at the opening. Also, it is much more easy for a consumer to e.g. exchange the dosing device since he/she does not have to ensure a tight seal. Further, the dosing device may not need to be fastened against upward movement since no liquid may be pressing on the dosing device from beneath. However, this implies that there should preferably not be any overpressure at the top of the liquid when it passes the opening, since it might then leak out of the opening. It might be permitted for the liquid to rise slightly, such as less than 10 mm, up a turtleneck shaped opening, but if it rises too high, even if it doesn't spill out of the turtleneck, additive added to the liquid surface in the opening might not mix well with the liquid stream and be transported away by it. Embodiments where the dosing device is fastened are, however, also contemplated, e.g. by means of a squeeze fit or a snap fit.

As mentioned above, the liquid, e.g. tap water, typically has an over pressure when entering the arrangement in the conduit since such an overpressure is often needed for transport of the liquid in the conduit. The conduit may e.g. be adapted to accommodate an overpressure of the liquid stream directly upstream, such as within 10 mm upstream, of the opening of the conduit wall in the range of 0.01 to 0.1 mbar. However, at the opening, this overpressure should be reduced to prevent leakage through the opening. Also, this transition from overpressure to ambient pressure may provide turbulence that may improve mixing of the additive with the liquid stream. One way of accomplishing this is by increasing the cross-sectional area of the conduit at or directly after the opening such that the conduit is provided with a cross-sectional area directly downstream of the opening of the conduit wall which is larger than a cross-sectional area directly upstream of the opening of the conduit wall. In this way the pressure drop after the opening is reduced, reducing the inclination of the liquid to be pressed out through the opening.

It may be convenient to increase the cross-sectional area downstream the opening at least partly by lowering the bottom part, i.e. the lowering conduit wall facing downward, of the conduit in relation to the bottom part upstream.

It may be convenient to allow the cross-sectional area downstream of, e.g. directly downstream or within 10 mm downstream, the opening of the conduit wall to be at least two times as large as the cross-sectional area upstream of, e.g. directly upstream or within 10 mm upstream, the opening of the conduit wall, such as at least three, four, six or ten times as large, depending on the overpressure prior to the opening.

It may be convenient to use a conduit with an essentially circular cross-section.

It may be convenient to allow the conduit downstream, e.g. directly downstream or within 10 mm downstream, of the opening of the conduit wall to have a maximum diameter of more than 5 mm, such as more than 7 or more than 10 mm, e.g. a diameter in the range of 5 to 15 millimeters. It may be convenient to allow the conduit upstream, e.g. directly upstream or within 10 mm upstream, of the opening of the conduit wall to have a diameter of less than 10 mm, such as less than 7 mm or less than 5 mm, e.g. in the range of 2 to 7 millimeters.

The dosing device may comprise a pumping mechanism for dispensing the additive. Such a pumping mechanism may e.g. be a positive displacement pumping mechanism. Such a pumping mechanism may allow accurate dispensing of small liquid volumes. Dosing device may e.g. arranged to, by means of the pumping mechanism and possibly a nozzle, spray a liquid additive with a scattering angle of 10-30° e.g. 15-25° such as about 20° directly into the liquid stream through the conduit opening, whereby the liquid stream catches all of the dispensed additive without allowing any additive to hit anything but the liquid stream thus not contaminating the arrangement.

The pumping mechanism of the dosing device may be magnetically actuated, e.g. by an electromagnetic actuator. This has the advantage that the dosing device may be passive, without driving parts, since the dosing device may be driven, or actuated, by an external actuator. The dosing device may thus be made less complex and much less expensive.

Thus, the arrangement may comprise an electromagnetic actuator arranged by, e.g. around or otherwise in the vicinity of, the dosing device, for driving the pumping mechanism of the dosing device. The electromagnetic actuator may e.g. be in the form of a solenoid. The electromagnetic actuator may e.g. have the shape of a toroid arranged around the dosing device.

At least a portion of the conduit directly downstream of the opening may slope downwardly. This may allow the liquid stream to flow by act of gravity and unaided by an overpressure of the stream, which may be beneficial if the stream is of ambient or atmospheric pressure. It may be convenient to allow the conduit to continuously slope downwardly from the opening to an open end of the conduit arranged to allow the liquid stream to exit the conduit. The open end may be open to the surroundings at atmospheric pressure. At the open end, the liquid stream may e.g. be collected in a container such as a cup, mug or glass by a consumer for drinking consumption.

The dosing device may be provided with the additive in many different ways. Preferably it may comprise a cartridge wherein the cartridge comprises a container, containing the additive to be dispensed, and a dosing device. Hence it may be convenient to arrange the dosing device to be connected to an additive container. Thus, the arrangement may comprise an additive container connected to the dosing device such that additive contained in the container may be supplied to and dispensed by the dosing device. The additive may e.g. be supplied to the dosing device through gravitational action, e.g. by placing the container above the dosing device with a hole in the bottom where the additive may flow to the dosing device. The container may e.g. be a bag of an inexpensive flexible material, such as paper and/or plastic, or a laminate comprising a plurality of thin sheet materials, whereby the bag may be disposable.

In order to make the arrangement less bulky, it may be convenient to use a highly concentrated additive which may be stored e.g. in a container as discussed above with relatively low volume. The dosing device may thus conveniently be adapted to dispense additive into the stream in a quantity corresponding to a dilution of the additive in the stream of 100 to 10 000 times, such as 250 to 1000 times or 300 to 700 times or 400 to 600 times. The dosing device may e.g. be configured to dispense additive into the stream in a quantity of between 0.1 and 100 milliliters per minute, such as in the range of 1 to 10 milliliters per minute.

The arrangement discussed above may be configured to accommodate a plurality of dosing devices. Thus, e.g. several different additives may be chosen for addition to a liquid. It may be convenient to position such plurality of dosing devices in parallel rather than in series since it may be difficult to achieve overpressure prior to two successive conduit openings at ambient pressure. However, embodiments of the invention where the dosing devices are placed in series along a single conduit are also contemplated. Thus, the arrangement may further comprise: a second conduit for guiding a second liquid stream, wherein an opening is provided through a wall of the conduit; and a second dosing device arranged at the opening of the second conduit wall and extending above the conduit, and arranged for dispensing an additive into the second stream through the opening; wherein the second conduit and dosing device are arranged such that a vertical distance is defined between the dosing devise and the second liquid stream to prevent direct contact there between; and wherein the conduits merge with each other downstream of the dosing devices. The liquid may stream in both conduits simultaneously, regardless of whether both additives are added or not, or the liquid may be guided to only one of the conduits if e.g. only one of the additives is to be added. It may be convenient to allow simultaneous flow in both conduits, past both dosing devices, in order not to need any extra valves for closing off either of the conduits. Thus, a liquid stream may be divided in two streams, each passing respective dosing device, and then be recombined to one stream thereafter. Of course, further dosing devices may be added in parallel in the same way.

In embodiments with a plurality of dosing devices, additive containers may be used which are not separated from each other. The containers may have a size corresponding to the distance between the dosing devices, or the positions of the arrangement adapted to receive the dosing devices (if e.g. the dosing devices are integrated with the containers), such that the containers may fit in the arrangement without having to separate them. Advantages include that there is no need to separate the containers as they are produced, and facilitated handling of the containers by virtue of fewer and larger discrete entities.

The arrangement may be made compact and flat enough to fit within a household appliance, such as a fridge. A fridge may be convenient since it comprises a cooling system that may be used to cool e.g. tap water that may function as the liquid to which additive may be added by the inventive arrangement. The arrangement may be integrated in e.g. a side of the fridge or the top of the fridge, but it may be convenient to integrate it into the door of a fridge.

Known systems for adding powder or liquid to a liquid beverage stream, e.g. adding coffee and milk to hot water in a coffee machine, are based on dispensing the additive at the very outlet of the hot water, essentially leaving the mixing of the finished beverage to be performed in the drinking glass or cup. This is a problem if many should be possible to choose from many different additives since all the different additive dispensers then need to fit side by side over the liquid outlet where the room is limited to the diameter of a regular glass or cup. In accordance with the inventive arrangement, this limitation is no longer relevant since the additives are added to the liquid further upstream and the liquid may be combined to a single stream prior to the outlet. It is also possible to obtain liquid without additives from an arrangement of the present invention by simply not activating the dosing device(s) since there may be very little or no contamination of the conduits. The risk of contamination in the conduits may be reduced further by turning off the dosing devices somewhat before, such as a 1-5 or 2-3 tenths of a second, before stopping the liquid flow, washing the conduits with clean liquid. Further, the conduit downstream of the dosing device may be inclined and sloping, allowing all or essentially all liquid therein to exit the conduit by gravitational action. Also, the conduit after the dosing device may be coated with an anti-stick material, such as Teflon, to reduce the risk of liquid and additive getting stuck in the conduit and contaminating liquid passing subsequently. Thus, the present invention provides an arrangement that may not need a wash cycle nor any other specific cleaning. The additive may thus only contaminate the dosing device, which may be disposable and exchangeable and e.g. integrated with the additive container; when the additive of a container is all used up, the container and the integrated dosing device may be thrown away by the consumer and a new and full container with an integrated dosing device may be easily put in its place.

If the arrangement is e.g. integrated in or with a fridge door, a consumer may be allowed easy access to the dosing device(s) and any additive container(s) e.g. via a maintenance door, e.g. a small door in the outside surface of a fridge door. Through the maintenance door, a consumer may e.g. easily replace disposable additive containers and dosage devices. The maintenance door may e.g. pivot outwardly round a horizontal axis or a vertical axis, preferably a vertical axis either on the right side or left side of the maintenance door.

Alternatively, the dosing device(s) and any additive container(s), as well as any other parts of the arrangement may be arranged inside the fridge, e.g. mounted on the inside of the fridge door, or integrated on the inside of the fridge door. A conduit may be arranged through a side wall of the fridge, such as through the fridge door, to allow obtaining the liquid in e.g. a glass from the outside of the fridge in a dispensing area, but the rest of the arrangement or at least a part of it may be inside the fridge. By arranging the arrangement at least partly inside the fridge instead of in a side wall of the same, the insulation of the fridge may be improved since it is less compromised by a non-insulating compartment containing the arrangement. Also, by arranging the dosing device(s) and any additive container(s) inside the fridge, the additive may be kept cold and the liquid may not be made less cold by the addition of the additive.

Even further by arranging the service access on the inside of a fridge, the number penetrations in the insulation can be kept to a minimum. Only the conduit for dispensing the liquid and some electrical wires to the user interface on the outside will be necessary to penetrate the insulation.

As discussed above, the dosing device may not need to be particularly fastened in place or sealed against the conduit since there may be atmospheric pressure below the dosing device, i.e. between the dosing device and the liquid stream in the opening of the conduit. The dosing device may e.g. be arranged with protrusions arranged to rest on the outside of the conduit wall around the opening such that the dosing device does not fall into the opening and into the liquid stream. In one specific embodiment, a toroid actuator is positioned around the opening on the outside of the conduit, whereby a through hole is formed through both the actuator and the conduit wall. The dosing device may then be placed extending inside the actuator, facilitating activation of the pumping mechanism by the actuator, and supported by protrusions resting in the toroid actuator. The dosing device may thus be held in place by the actuator and gravity, and may easily be replaced by a consumer by simply lifting the old dosing device, possibly connected to an old additive container, and replacing it with another dosing device, possibly connected to another additive container. Of course, the removed dosing device and container may not be empty, but may be replaced again when it may be desired to use that additive again.

The dosing devices and/or additive containers may be provided with ID tags, such as barcodes of transponders, such as RFID tags, in order to identify which additive is contained and dispensed. The ID tags may be detected by an ID detector positioned in the arrangement, such as on the conduit or the actuator or on some other part of the arrangement close to where the intended position of the dosing device. The detector may also be positioned outside of the arrangement, but close enough to the intended position of the dosing device to detect its ID tag, such as on a wall of a compartment within a household appliance within which compartment the arrangement is adapted to be positioned. Thus, e.g. a fridge comprising the inventive arrangement may e.g. present to a consumer which additive(s) that may be chosen, on e.g. a display on the fridge door. Also other information than the name of the additive may be displayed, such as the name of the producer or commercial information or advertisement.

It is further contemplated that the inventive arrangement may comprise a plurality of dosing devices/additive containers containing a plurality of different nutrients such as vitamins, minerals, medicines, stimulants etc, and that predefined mixtures of these may be provided by the inventive arrangement. E.g. if one button is pressed, or one predefined program is chosen from an interactive display such as a touch display, the arrangement provides a nutrient mixture suitable for a male consumer. Similarly, nutrient mixtures may e.g. be provided for female consumers or for children, or for recovering after training or poor sleep. Of course, similarly, pre-programmed combinations additive combinations may also be obtained with regular flavouring additives. New combinations or updates may also be downloaded from the internet.

Referring now to FIG. 1, a dosing device 1 is connected to an additive container 2. The additive container 2 contains the additive to be dispensed into the liquid stream. The dosing device 1 connected to the additive container 2 at a hole in the additive container 2 such that the additive contained in the additive container 2 may flow, by act of gravity, out of the additive container 2 and into the dosing device 1 which may dispense the additive through the nozzle 4. The dosing device 1 comprises a protrusion 5 for positioning the dosing device in relation to the opening of the conduit of the present arrangement such that the nozzle 4 does not too far towards or through the opening of the conduit when the dosing device is correctly positioned in the arrangement. The dosing device of this exemplary embodiment also comprises an RFID tag 3 for identification of the additive contained in the container 2.

Figure 2:
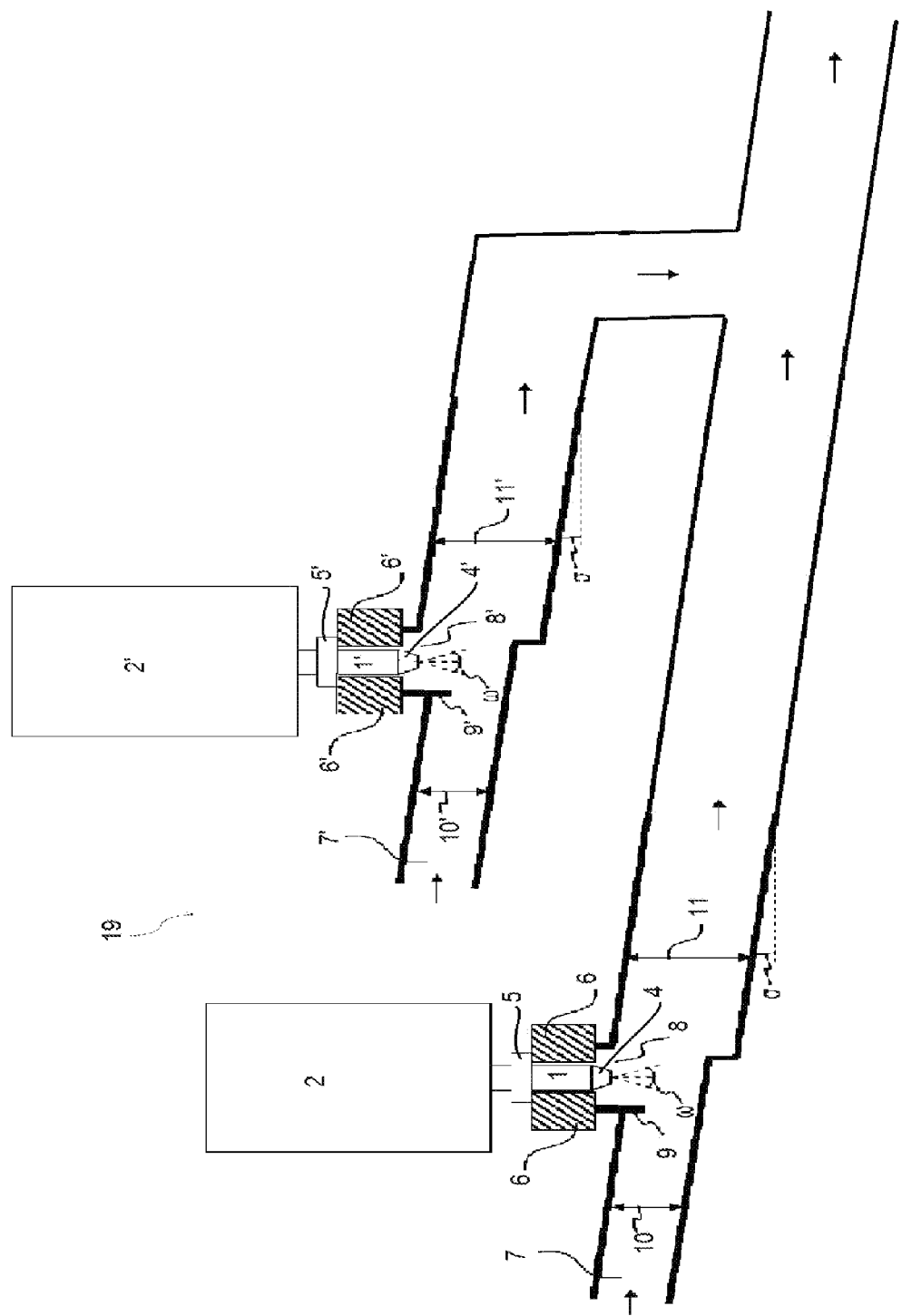
FIG. 2 is a schematic front view, partly in cross-section of a dispensing arrangement according to a specific embodiment of the present invention.

Referring now to FIG. 2, the dosing device 1 and additive container 2 are positioned over an opening 8 of the liquid conduit 7. The dosing device 1 is held in place by gravity and the circumferential protrusion 5 resting on a toroid shaped solenoid actuator 6, in FIG. 2 shown in cross-section. The dosing device thus extends through the central opening of the solenoid toroid 6. This design makes it very easy to position, remove and replace the dosing device for a consumer since the dosing device is not fastened in place or sealed against e.g. the actuator 6, but this design also implies that the pressure in the opening 8 is the same as, or close to, the ambient pressure, at least the pressure may not be substantially higher than ambient since the dosing device 1 may then be moved by that overpressure, allowing air and liquid to escape the conduit 7. The conduit is arranged for a liquid stream to flow through it in the direction from left to right in FIG. 2, as indicated by the single headed arrows. The diameter of the conduit, as indicated by the double headed arrows 10 and 11, is substantially larger downstream of the opening 8, as indicated by double headed arrow 11, than upstream of the opening 8, as indicated by double headed arrow 10, in this example about twice as large. Due to this widening of the conduit, the pressure at the opening 8 may be atmospheric, even though the liquid upstream the opening has an overpressure. The conduit 7 is inclined in relation to the horizontal plane, as indicated by the angle σ in FIG. 2, such that the conduit 7 continuously slopes downward, allowing liquid therein to flow downstream by means of gravity, without a need for overpressure. The nozzle 4 is arranged to spray a liquid additive, as indicated by the dashed lines from the nozzle 4, into the stream of in the conduit 7, though the opening 8, without the additive contacting the conduit wall, or any other parts of the arrangement, i.e. all the additive is collected by the liquid stream. The scattering angle ω of the liquid additive sprayed by the nozzle 4 may be about 20°. The conduit 7 might comprise a pressure dropping element 9 to reduce the pressure of the liquid stream in the conduit 7 upstream of the opening 8 to further reduce the risk of overpressure in the opening 8.

Figure 3:
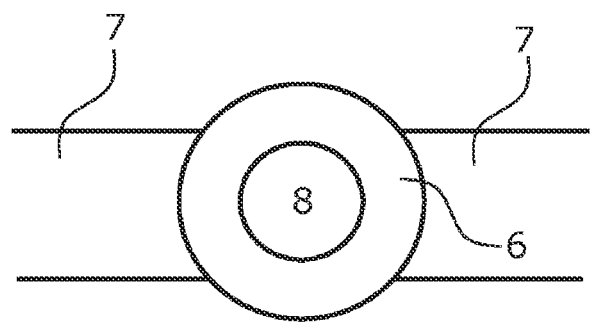
FIG. 3 is a schematic top view of a part of a dispensing arrangement according to a specific embodiment of the present invention.

With reference to FIG. 3, the toroid actuator 6 is viewed from above, as compared with the side view of FIG. 2. The toroid 6 is positioned with its central hole superimposing the opening 8 of the conduit 7 such that the dosing device may be placed at least partly extending through the toroid 6 hole as shown in FIG. 2.

Figure 4:
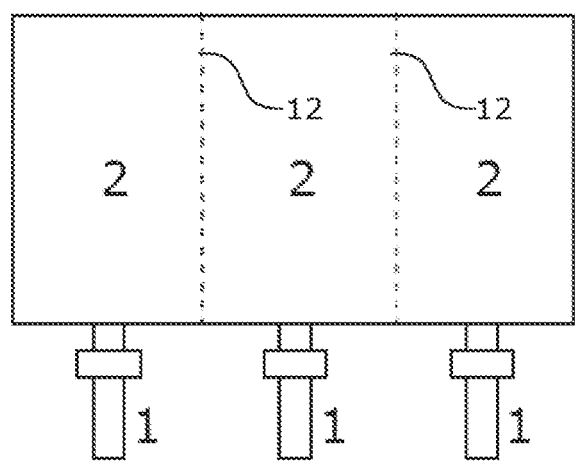
FIG. 4 is a schematic front view of dosing devices and additive containers according to a specific embodiment of the present invention.

With reference to FIG. 4, three dosing devices 1 with respective additive containers 2 are illustrated. The containers 2 are not separated from each other. Rather, they are connected via the joints 12, e.g. weld joints, which allows for separation between the different additives in the containers 12 but not the complete separation of the containers 12 from each other.

Figure 5:
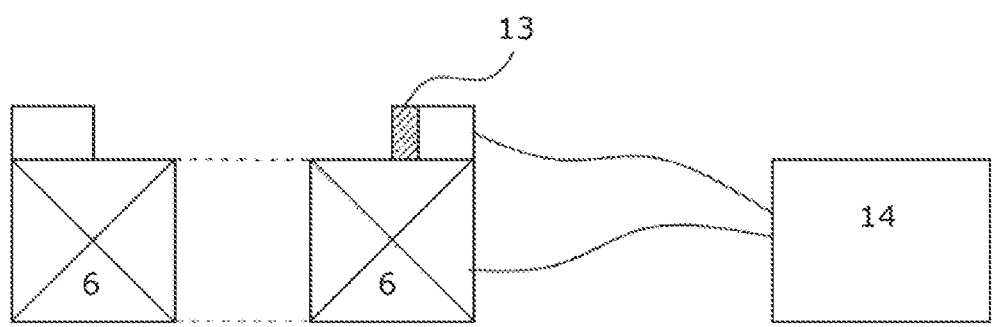
FIG. 5 is a schematic front view, partly in cross-section of a part of a dispensing arrangement according to a specific embodiment of the present invention.

With reference to FIG. 5, a toroid actuator 6 is again shown in cross-section, cf. FIG. 2. An ID tag detector 13 is attached to the actuator 6 for detecting an ID tag of a dosing device 1 and/or additive container 2 when the dosing device 1 is in place at least partly extending through the central hole of the actuator 6. A processing unit 14 is connected to the actuator 6 and the detector 13 such that the processing unit may e.g. control the actuator and thus the dispensing of additive, as well as identifying the additive and either make its own decisions regarding dosing etc from that identification or present information about the additive e.g. on a display (not shown) for a consumer to make decisions based thereon.

Figure 6:
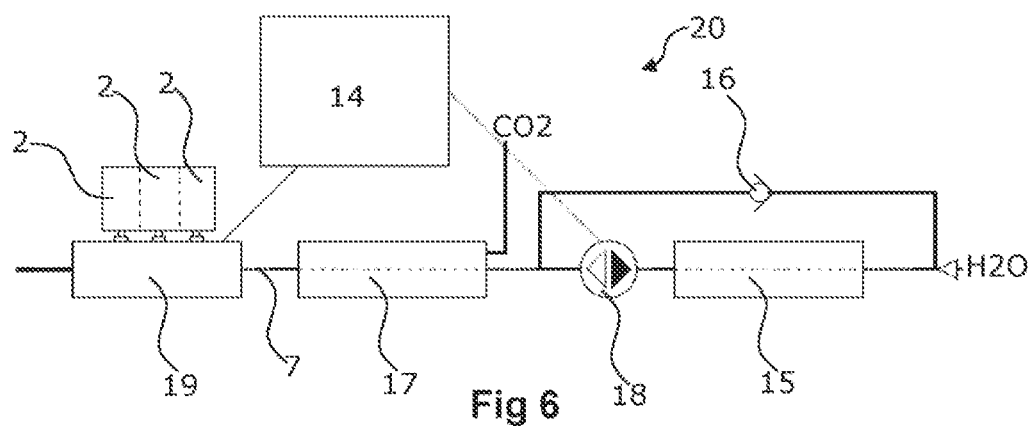
FIG. 6 is a schematic front view of a water processing system comprising a dispensing arrangement according to a specific embodiment of the present invention.

With reference to FIG. 6, a system 20 for flavouring water is schematically illustrated. Water, e.g. regular household water, enters the system from the right in FIG. 6. If chilled water is desired, the water passes the chiller 15, if not, the water bypasses the chiller 15 via the one-way valve 16. If needed, a pump 18 may be included in the system 20 to push the water forward. If carbonation of the water is desired, the water then passes the carbonator 17, carbonating the water by adding carbon dioxide (CO2). Also the carbonator 17 may be bypassed (not shown) in a similar way as the chiller 15 may be bypassed or the carbonator may be turned off such that CO2 is no longer introduced into the liquid streaming there through, if no carbonation is desired. The water may then enter the dispensing arrangement 19 of the present invention through the conduit 7, in this example comprising three dosing devices 1 and corresponding three additive containers 2. A processing unit 14 may control, and receive input from, different parts of the system 20 such as the pump 18 and the flavouring arrangement 19. Of course, a similar system may be used with other additives than flavouring additives and/or with other liquid than water.

Figure 7:
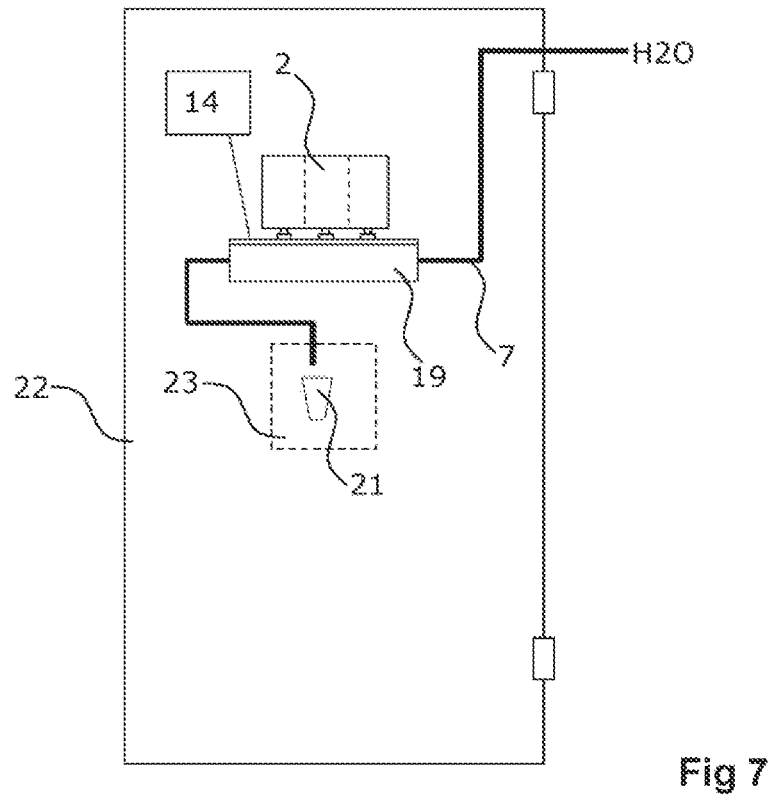
FIG. 7 is a schematic cross-sectional front view of a fridge door comprising a dispensing arrangement according to a specific embodiment of the present invention.

With reference to FIG. 7, a fridge door 22 comprising a built in dispensing arrangement 19 of the present invention is schematically illustrated in cross-section. In FIG. 7, water enters the fridge door 22 via the conduit 7 from the top left and enters the dispensing arrangement 19 controlled by the processing unit 14. The water than exits the dispensing arrangement 19, still in conduit 7, and may exit the conduit 7 to fall into e.g. a mug 21 placed in a recess 23 of the door 22 by a consumer.

The invention claimed is:

1. A method of dispensing an additive into a liquid stream, the method comprising:
   guiding a liquid stream through a conduit, the conduit having an opening provided through a wall of the conduit;
   dispensing an additive into the liquid stream through the opening by means of a dosing device arranged at the opening of the conduit wall and extending above the conduit;
   wherein the conduit and dosing device are arranged such that a vertical distance is defined between the dosing device and the liquid stream whereby there is no direct contact between the dosing device and the liquid stream, wherein the conduit is provided with a cross-sectional area directly downstream of the opening of the conduit wall which is larger than a cross-sectional area directly upstream of the opening of the conduit wall, and
   wherein the conduit is inclined in relation to a horizontal plane, such that the conduit continuously slopes downstream of the opening and the diameter of the conduit downstream of the opening is constant.

2. The method of claim 1, wherein the conduit downstream of the opening of the conduit wall has a diameter in the range of 5 to 15 millimeters and the conduit upstream of the opening of the conduit wall has a diameter in the range of 2 to 7 millimeters.

3. An arrangement for dispensing an additive into a liquid stream, the arrangement comprising:
   a conduit for guiding a liquid stream, wherein an opening is provided through a wall of the conduit; and
   a dosing device arranged at the opening of the conduit wall and extending above the conduit, and arranged for dispensing an additive into the stream through the opening;
   wherein the conduit and the dosing device are arranged such that a vertical distance is defined between the dosing device and the liquid stream to prevent direct contact between the dosing device and the liquid stream when in use, wherein the conduit is provided with a cross-sectional area directly downstream of the opening of the conduit wall which is larger than a cross-sectional area directly upstream of the opening of the conduit wall, and
   wherein the conduit is inclined in relation to a horizontal plane, such that the conduit continuously slopes downstream of the opening and the diameter of the conduit downstream of the opening is constant.

4. The arrangement of claim 3, wherein the arrangement is configured for a pressure in the opening of the conduit wall which is atmospheric or less.

5. The arrangement of claim 3, wherein the cross-sectional area downstream of the opening of the conduit wall is at least two times as large as the cross-sectional area upstream of the opening of the conduit wall.

6. The arrangement of claim 3, wherein the additive is liquid.

7. The arrangement of claim 3, wherein the dosing device comprises a positive displacement pumping mechanism.

8. The arrangement of claim 3, wherein the dosing device comprises a magnetically actuated pumping mechanism.

9. The arrangement of claim 3, further comprising an electromagnetic actuator arranged around the dosing device.

10. The arrangement of claim 3, wherein at least a portion of the conduit directly downstream of the opening slopes downwardly.

11. The arrangement of claim 10, wherein the conduit continuously slopes downwardly from the opening to an open end of the conduit arranged to allow the liquid stream to exit the conduit.

12. The arrangement of claim 3, further comprising an additive container connected to the dosing device such that additive contained in the container may be supplied to and dispensed by the dosing device.

13. The arrangement of claim 3, wherein the dosing device is adapted to dispense additive into the stream in a quantity corresponding to a dilution of the additive in the stream of 250 to 1000 times.

14. The arrangement of claim 3, wherein the dosing device is configured to dispense additive into the stream in a quantity of between 1 and 10 milliliters per minute.

15. The arrangement of claim 3, wherein the conduit is adapted to accommodate an overpressure of the liquid stream relative to an atmospheric pressure directly upstream of the opening of the conduit wall in the range of 0.01 to 0.1 mbar.

16. The arrangement of claim 3, further comprising:
   a second conduit for guiding a second liquid stream, wherein an opening is provided through a wall of the conduit; and
   a second dosing device arranged at the opening of the second conduit wall and extending above the conduit, and arranged for dispensing an additive into the second stream through the opening;
   wherein the second conduit and dosing device are arranged such that a vertical distance is defined between the dosing devise and the second liquid stream to prevent direct contact there between; and
   wherein the conduits merge with each other downstream of the dosing devices.

17. The arrangement of claim 3, wherein the arrangement is adapted to be integrated in a fridge door.

18. A fridge door comprising the arrangement of claim 3.

19. The arrangement of claim 3, wherein the conduit comprises a pressure dropping element configured to reduce a pressure of the liquid stream in the conduit upstream of the opening of the conduit wall and to reduce a risk of overpressure in the opening of the conduit wall.

20. The arrangement of claim 3, wherein the conduit downstream of the opening of the conduit wall has a diameter in the range of 5 to 15 millimeters and the conduit upstream of the opening of the conduit wall has a diameter in the range of 2 to 7 millimeters.

* * * * *